US008849944B2

(12) United States Patent
Schneider

(10) Patent No.: US 8,849,944 B2
(45) Date of Patent: Sep. 30, 2014

(54) MULTI-USE APPLICATION PROXY

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1549 days.

(21) Appl. No.: 11/998,017

(22) Filed: Nov. 27, 2007

(65) Prior Publication Data

US 2009/0138956 A1    May 28, 2009

(51) Int. Cl.
*G06F 15/16* (2006.01)
*H04L 29/08* (2006.01)

(52) U.S. Cl.
CPC .................................. *H04L 67/327* (2013.01)
USPC .......................................... 709/217; 709/203

(58) Field of Classification Search
USPC ................. 709/202–203, 217–226
See application file for complete search history.

(56) References Cited

U.S. PATENT DOCUMENTS

| | | | |
|---|---|---|---|
| 5,410,681 A | 4/1995 | Jessen et al. | |
| 5,737,517 A | 4/1998 | Kite et al. | |
| 5,838,919 A | 11/1998 | Schwaller et al. | |
| 6,189,031 B1 | 2/2001 | Badger et al. | |
| 6,219,803 B1 | 4/2001 | Casella et al. | |
| 6,397,359 B1 * | 5/2002 | Chandra et al. | 714/712 |
| 6,920,502 B2 | 7/2005 | Araujo et al. | |
| 6,963,996 B2 | 11/2005 | Coughlin | |
| 6,981,041 B2 | 12/2005 | Araujo et al. | |
| 7,006,963 B1 * | 2/2006 | Maurer | 703/21 |
| 7,043,546 B2 | 5/2006 | Smith et al. | |
| 7,065,549 B2 | 6/2006 | Sun et al. | |
| 7,072,951 B2 | 7/2006 | von Klopp et al. | |
| 7,111,060 B2 | 9/2006 | Araujo et al. | |
| 7,269,633 B2 | 9/2007 | Allan | |
| 7,349,867 B2 | 3/2008 | Rollins et al. | |
| 7,392,321 B1 | 6/2008 | Wolf et al. | |
| 7,415,429 B2 | 8/2008 | Rollins et al. | |
| 7,481,361 B2 | 1/2009 | Dickerson et al. | |
| 7,519,702 B1 | 4/2009 | Allan | |
| 7,895,446 B2 | 2/2011 | Harada et al. | |
| 8,069,407 B1 * | 11/2011 | Armandpour et al. | 715/234 |
| 2002/0032798 A1 * | 3/2002 | Xu | 709/238 |
| 2002/0042839 A1 * | 4/2002 | Peiffer et al. | 709/238 |
| 2002/0143931 A1 | 10/2002 | Smith et al. | |
| 2002/0188661 A1 | 12/2002 | Casais | |
| 2003/0041124 A1 * | 2/2003 | Navarre et al. | 709/219 |
| 2003/0055883 A1 | 3/2003 | Wiles | |
| 2003/0163608 A1 | 8/2003 | Tiwary et al. | |
| 2003/0164850 A1 | 9/2003 | Rojewski et al. | |
| 2003/0197719 A1 | 10/2003 | Lincke et al. | |
| 2003/0236883 A1 * | 12/2003 | Takeshima et al. | 709/225 |
| 2004/0001077 A1 | 1/2004 | Patterson | |

(Continued)

OTHER PUBLICATIONS

Tsai, W. T., et al., "Verification of Web Services Using an Enhanced UDDI Server," Proceedings of the 8th IEEE Int'l Workshop on Object-Oriented Real-Time Dependable Systems, pp. 131-138, Jan. 2003 (8 pgs.).

(Continued)

*Primary Examiner* — Yasin Barqadle
(74) *Attorney, Agent, or Firm* — Lowenstein Sandler LLP

(57) ABSTRACT

Some embodiments of a multi-use application proxy have been presented. In one embodiment, an application proxy is executed as an intermediary a set of applications. The application proxy performs multiple functions between the set of applications. For example, the application proxy aggregates interactions between the applications and a client in one embodiment.

20 Claims, 6 Drawing Sheets

(56) References Cited

U.S. PATENT DOCUMENTS

| | | | |
|---|---|---|---|
| 2004/0059809 A1 | 3/2004 | Benedikt et al. | |
| 2004/0111488 A1 | 6/2004 | Allan | |
| 2004/0143931 A1 | 7/2004 | Dennis | |
| 2004/0172253 A1 | 9/2004 | Singh | |
| 2004/0225999 A1 | 11/2004 | Nuss | |
| 2004/0267820 A1 | 12/2004 | Boss et al. | |
| 2006/0005079 A1 | 1/2006 | Kaplan et al. | |
| 2006/0085537 A1 | 4/2006 | Dickerson et al. | |
| 2007/0022406 A1 | 1/2007 | Liu | |
| 2007/0050844 A1 | 3/2007 | Lebel | |
| 2007/0069005 A1 | 3/2007 | Dickerson et al. | |
| 2007/0124453 A1* | 5/2007 | Slaughter et al. | 709/223 |
| 2007/0248105 A1* | 10/2007 | Shinoda et al. | 370/401 |
| 2008/0052548 A1* | 2/2008 | Olsen et al. | 713/310 |
| 2008/0065702 A1 | 3/2008 | Dickerson et al. | |
| 2008/0080531 A1 | 4/2008 | Williams et al. | |
| 2008/0133210 A1 | 6/2008 | Chagoly et al. | |
| 2008/0177824 A1 | 7/2008 | Wang et al. | |
| 2009/0089404 A1 | 4/2009 | Guo | |
| 2009/0095807 A1 | 4/2009 | Dickerson et al. | |
| 2010/0251217 A1 | 9/2010 | Miller | |
| 2010/0281457 A1 | 11/2010 | Ren | |

OTHER PUBLICATIONS

Office Action for U.S. Appl. No. 11/985,670, mailed Oct. 2, 2009, (14 pgs.).
Final Office Action for U.S. Appl. No. 11/804,702, mailed Jun. 11, 2009, (5 pgs.).
Final Office Action for U.S. Appl. No. 11/804,702, mailed Nov. 17, 2009, (6 pgs.).
Final Office Action for U.S. Appl. No. 11/804,702, mailed Feb. 25, 2010, (8 pgs.).
Final Office Action for U.S. Appl. No. 11/985,670, mailed Mar. 29, 2010, (15 pgs.).
Advisory Action for U.S. Appl. No. 11/985,670, mailed May 26, 2010 (3 pgs.).
Final Office Action for U.S. Appl. No. 11/804,702, mailed Jun. 15, 2010, (6 pgs.).
Simple Network Management Protocol from Wikipedia http://en.wikipedia.org/wiki/SMNP. Oct. 31, 2007. 12 pages.
Redhat Command Center. Redhat.com. http://www.redhat.com/command_center. Sep. 18, 2007. 4 pages.
Hypertext Transfer Protocol—HTTP/1.1, The Secure Hypertext Transfer Protocol. Jun. 1999, 114 pages.
HMAC: Keyed-Hashing for Message Athentication. Feb. 1997. 11 pages.
The Advanced Encryption Standard-Cipher-based Message Authentication Code-Pseudo-Random Function-128. Aug. 2006. 7 pages.
HTTP Over TLS. May 2000. 7 pages.
The Transport Layer Security (TLS) Protocol Version 1.1, Apr. 2006. 82 pages.
HTTP Authentication: Basic and Digest Access Authentication. Jun. 1999. 32 pages.
Hypertext Transfer Protocol (HTTP) Digest Authentication Using Authentication and Key Agreement (AKA) Version-2. Nov. 2005. 13 pages.
http://jakarta.apache.org/jmeter/. Feb. 23, 2007. 2 pages.
http://www.aepnetworks.com/ AEP Netilla Security Platform (NSP). 2007. 2 pages.
http://httpd.apache.org/docs/2.0/. Apr. 24, 2007. 192 pages.
Office Action for U.S. Appl. No. 11/985,122, mailed Jan. 24, 2011.
Final Office Action for U.S. Appl. No. 11/985,122, mailed Jun. 7, 2011.
Office Action for U.S. Appl. No. 11/985,122, mailed Mar. 6, 2012.
Advisory Action for U.S. Appl. No. 11/985,122, mailed Oct. 24, 2011.
Advisory Action for U.S. Appl. No. 11/985,670, mailed May 28, 2010.
Notice of Allowance for U.S. Appl. No. 11/985,670, mailed Mar. 29, 2012.
Office Action for U.S. Appl. No. 11/804,702, mailed Oct. 6, 2010.
Notice of Allowance for U.S. Appl. No. 11/804,702, mailed Feb. 23, 2011.
Advisory Action for U.S. Appl. No. 11/804,702, mailed May 10, 2010.
Advisory Action for U.S. Appl. No. 11/804,702, mailed Aug. 16, 2010.

* cited by examiner

MULTI-USE APPLICATION PROXY

TECHNICAL FIELD

Embodiments of the present invention relate to software applications, and more specifically to providing a multi-use application proxy between the applications and one or more clients.

BACKGROUND

As the use of computers and the Internet becomes more and more popular, many different types of software applications (also simply referred to as applications) are developed to perform various tasks. Furthermore, many applications interact with each other as well as with one or more clients or users during operation in order to carry out various transactions between individuals and/or entities (e.g., corporations, government, etc.). A transaction as used herein broadly refers to a series of exchanges between an application and another entity, which may include one or more of a user, another application, a client machine, etc. One example of a transaction is a session that begins with a user logging into an application (e.g., an online sale application, a database management application, etc.) and ends with the user logging out of the application.

Because the applications interact with each other and/or clients, it may be difficult to test and/or debug an individual application as the application interactions have to be manually re-created. Furthermore, as the number of applications increases, and hence, the volume and complexity of application interaction grow, it becomes more and more difficult to manually re-create the application interactions to effectively test the applications.

In addition to the difficulties in testing individual applications, other problems arise while various applications interact with each other during normal operations. For instance, conflict may arise as two or more applications are trying to send requests and/or responses substantially simultaneously to the client. Moreover, as the client receives multiple responses and/or requests from different applications, different and separate user interfaces may be used to present these responses and/or requests to the user, which may lead to user confusion and/or impeded user experience.

BRIEF DESCRIPTION OF THE DRAWINGS

The present invention is illustrated by way of example, and not by way of limitation, in the figures of the accompanying drawings and in which.

DETAILED DESCRIPTION

Figure 1:
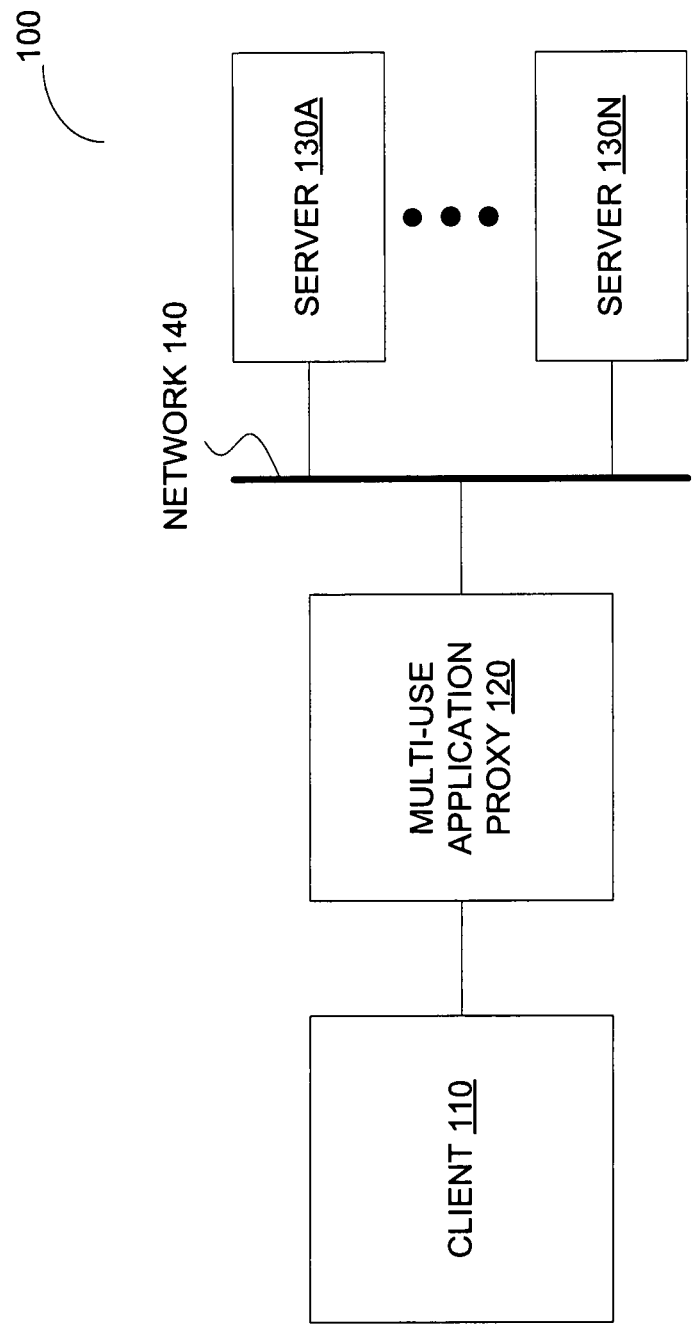
FIG. 1 illustrates one embodiment of a system in which embodiments of the present invention may be implemented.

Described herein are some embodiments of a multi-use application proxy. In one embodiment, an application proxy is executed while a set of applications are executing. The application proxy acts as an intermediary between the set of applications. The application proxy may perform various functions between the applications, such as aggregating interactions between the applications and a client, emulating interactions, injecting faults into interactions between the applications and a client to test the applications, performing security screening on the interactions, etc. Thus, the application proxy may also be referred to as a multi-use application proxy herein. More details of some embodiments of the multi-use application proxy are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium and computer readable medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a system in which embodiments of the present invention may be implemented. The system 100 includes a client machine 110, a multi-use application proxy 120, a number of application servers 130A-130N, and a network 140. The client machine 110 is coupled to the multi-use application proxy 120, which is further coupled to the applications servers 130A-130N via the network 140, which may include various types of networks (e.g., intranet, Internet, etc.). The client machine 110 may include a computing machine, such as a desktop personal computer (PC), a laptop PC, a personal digital assistant (PDA), a mobile telephone, etc. The multi-use application proxy 120 may be implemented using a computing machine, such as the one illustrated in FIG. 4.

Note that any or all of the components of the system 100 and associated hardware may be used in various embodiments of the present invention. However, it can be appreciated that other configurations of the system 100 may include more or fewer devices than those discussed above.

The multi-use application proxy 120 performs various functions while acting as an intermediary between the client machine 110 and the application servers 130A-130N. For example, the multi-use application proxy 120 serves as a gateway between the client machine 110 and the application servers 130A-130N when the application servers 130A-130N are executing web-based applications. In this example, the network 140 includes at least the Internet. In some embodiments, the multi-use application proxy 120 aggregates data transmitted between the client machine 110 and the application servers 130A-130N and provide the client machine 110 with a substantially seamless application experience. In addition to, or as an alternative to, the above exemplary functions, the multi-use application proxy 120 may perform other functions, such as mediating responses and requests between the client machine and the application servers 130A-130N, emulating responses and/or requests from one of the application servers 130A-130N during testing, intentionally injecting faults into communication between the client machine 110 and the application servers 130A-130N during testing, screening data transmitted between the client machine 110 and the application servers 130A-130N for security violation (e.g., screening for virus, etc.), etc. More details of some examples of the functions of the multi-use application proxy are discussed below.

Note that the communication and/or interaction between the client machine 110, the multi-use application proxy 120, and the application servers 130A-130N described herein may be done over secured connections and/or non-secured connections between the client 110, the multi-use application proxy 120, and the application servers 130A-130N. One example of a secured connection is a secure hypertext transfer protocol (HTTPS) connection. In some embodiments, where sensitive and/or private data is sent between the client 110, the multi-use application proxy 120, and/or the application servers 130A-130N (e.g., passwords to log into a bank account, personal information, such as credit card numbers, social security number, etc.), the above communication and/or interaction may be performed over secured connections to protect the data.

In addition to, or as an alternative to, networking, the communication and/or interaction between the client machine 110, the multi-use application proxy 120, and the application servers 130A-130N described herein may be performed using other communication mechanisms. For example, the interactions and communications may be performed using pipes, message queues, files, etc.

Figure 2:
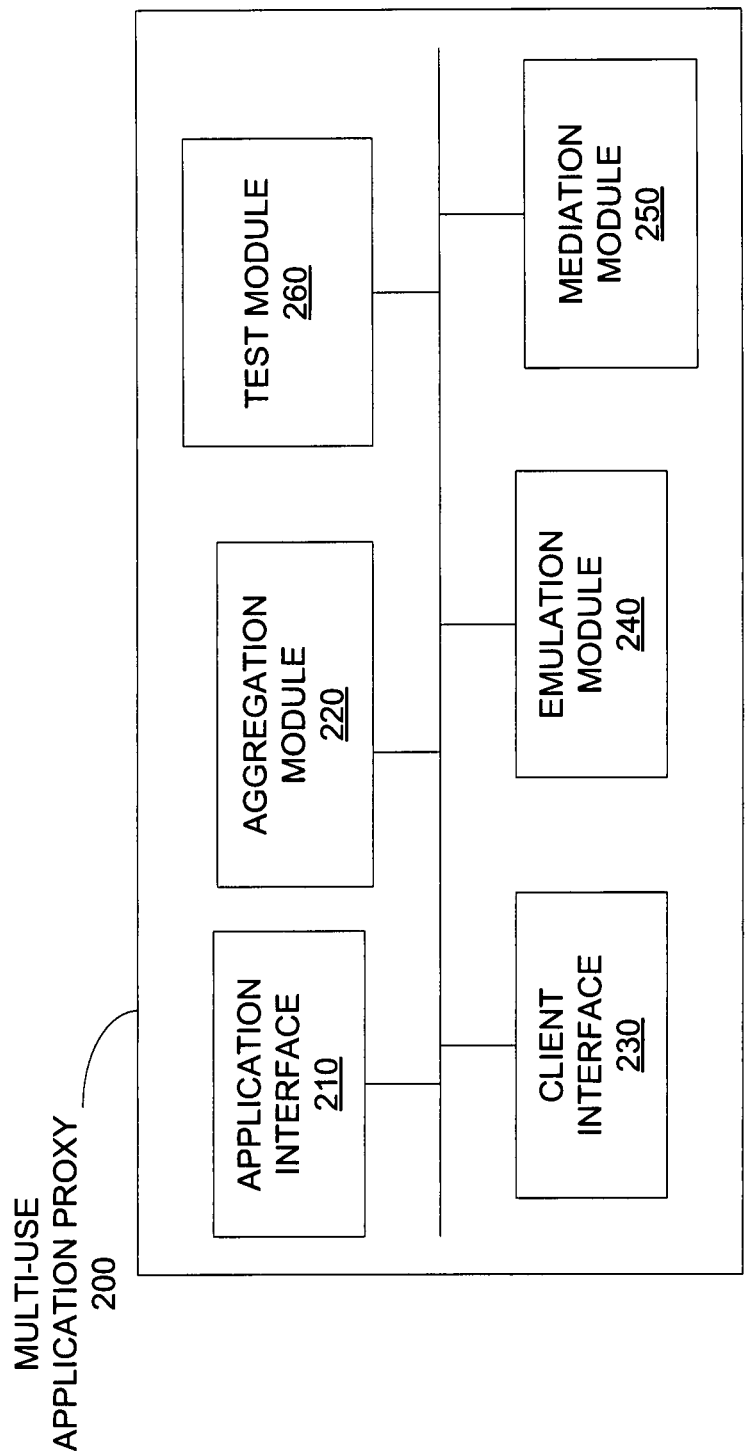
FIG. 2 illustrates a functional block diagram of one embodiment of a multi-use application proxy.

FIG. 2 illustrates a functional block diagram of one embodiment of a multi-use application proxy. The multi-use application proxy 200 may be implemented on a computing device, such as the one described below with reference to FIG. 4. The multi-use application proxy 200 includes an application interface 210, an aggregation module 220, a client interface 230, an emulation module 240, a mediation module 250, and a test module 260, which are operatively coupled to each other.

In some embodiments, the application interface 210 communicatively couples to one or more applications via a first network, which may include an intranet, an Internet, etc. Via the network, the application interface 210 receives and sends responses and requests to the applications, which are being executed on one or more application servers (e.g., the application servers 130A-130N in FIG. 1). Likewise, the client interface 230 of the multi-use application proxy 200 communicatively couples to a client via a second network, which may be the same or a different network than the first network, to a client, where the client is being executed on a client machine (e.g., the client machine 110 in FIG. 1). As such, the multi-use application proxy 200 acts as an intermediary between the client and the applications.

In some embodiments, the aggregation module 220 in the multi-use application proxy 200 aggregates interactions between the client and multiple applications. For instance, the aggregation module 220 may combine the data or information contained in the responses from the applications to generate a single response to be sent to the client. In one example, the aggregation module 220 combines a billing invoice from a sale application with an updated account statement from a banking application to generate a single response containing an updated account balance and a sale receipt. The single response is then sent to the client so that the client may view both updated account balance and sale receipt together. As such, the multi-use application proxy 200 creates a substantially seamless experience for the client even though the sale application and the banking application may be executed on separate servers provided by two unrelated entities. Furthermore, the above technique protects the client's information from the providers of the applications because the aggregation of data is carried out at the multi-use application proxy 200 and does not require sending the data to the providers of the applications.

In some embodiments, the emulation module 240 emulates responses and/or requests from an application and/or the client for testing purposes. For example, the emulation module 240 may emulate a request from the client as if the request is sent from the client, and then send the request to the application during testing in order to determine if the application can respond as specified to the request.

In addition to emulation, the test module 260 in the multi-use application proxy 200 may inject faults into communication between the client and the application for testing. For instance, the test module 260 may modify a password submitted by the client in order to deliberately create an error so that the mechanism to respond to error of the application may be tested. In another example, the test module 260 may inject faults into the communication in order to test a network protocol or communication protocol.

In some embodiments, the multi-use application proxy 200 further includes a mediation module 250 to mediate interaction and/or communication between the client and applications. For instance, multiple applications may send responses to the client at substantially the same time but the bandwidth of the network reaching the client may be limited. The mediation module 250 may intercept the responses and prioritize the responses in order to send the responses to the client according to the priority of the responses in order to better utilize the network bandwidth.

Figure 3A:
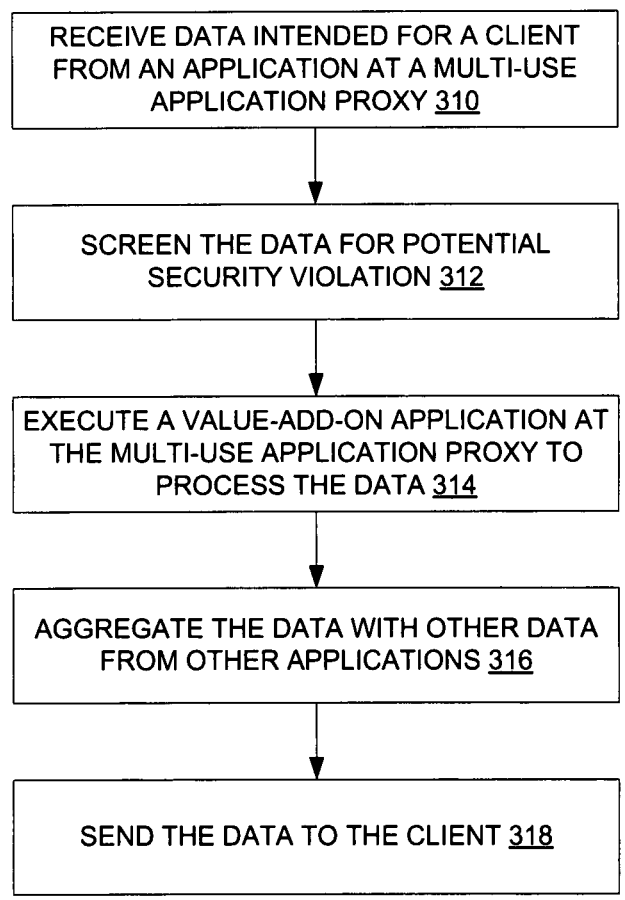
FIG. 3A illustrates a flow diagram of one embodiment of a process to use an application proxy between different applications.

FIG. 3A illustrates a flow diagram of one embodiment of a process to use an application proxy between different applications. The process may be performed by processing logic that may comprise hardware (e.g., circuitry, dedicated logic, programmable logic, microcode, etc.), software (such as instructions run on a processing device), firmware, or a combination thereof. For example, the multi-use application proxy 200 in FIG. 2 may perform at least part of the process in some embodiments.

Referring to FIG. 3A, processing logic receives data intended for a client from an application at the multi-use application proxy (processing block 310). For instance, processing logic may receive financial account information intended for a user logged onto the client from a financial service application. Processing logic may screen the data for potential security violation (processing block 312). For example, processing logic may check the data to ensure there is no virus contained in the data. In another example, processing logic may check the data to ensure that the data is not part of an unsolicited mass mailing electronic mail message (e.g., a spam).

In some embodiments, processing logic executes a value-add-on application at the multi-use application proxy to process the data (processing block 314). For example, the data may include a billing invoice on office equipment purchased for a corporation. The value-add-on application may use the data to automatically generate a draft of a reimbursement request so that a user may simply review the draft instead of reviewing the invoice and then manually generate the reimbursement request at the client machine.

In some embodiments, processing logic aggregates the data with other data from other applications (processing block 316). For example, processing logic may combine data in a billing invoice from a sale application with data in an updated account statement from a banking application to generate a single response containing an updated account balance and a sale receipt. Finally, processing logic sends the processed data to the client (processing block 318).

Figure 3B:
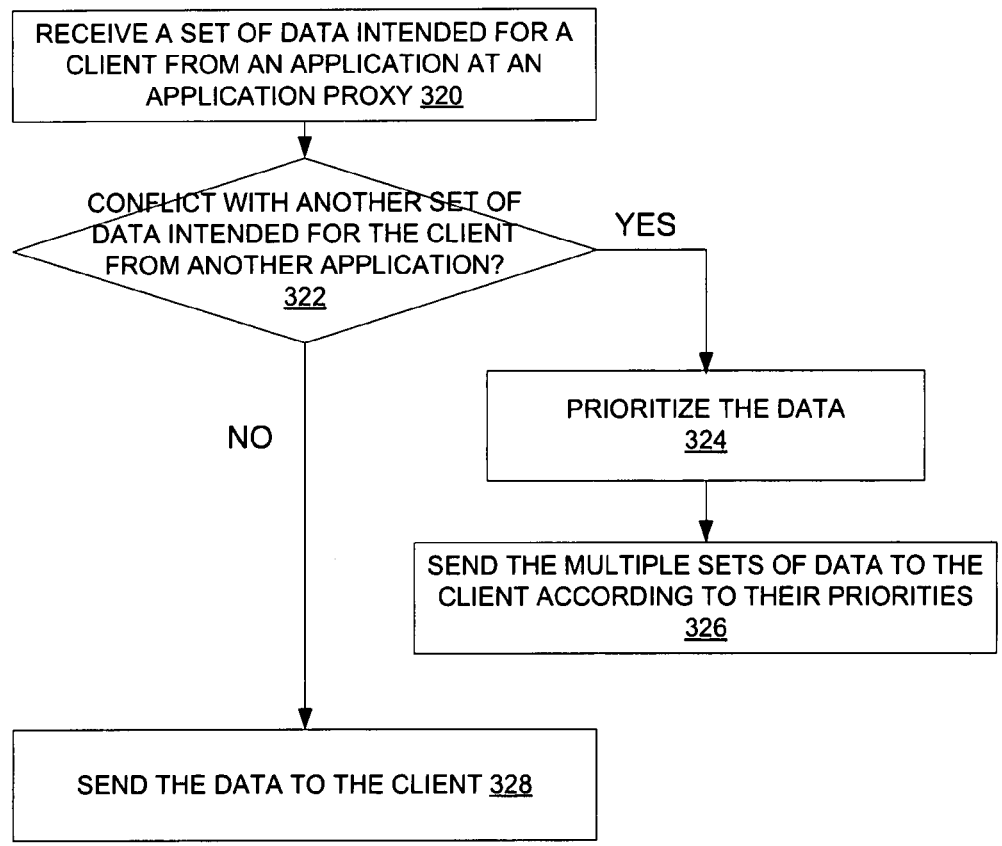
FIG. 3B illustrates a flow diagram of one embodiment of a process to use an application proxy to mediate data sent from different applications.

FIG. 3B illustrates a flow diagram of one embodiment of a process to use an application proxy to mediate data sent from different applications. The process may be performed by processing logic that may comprise hardware (e.g., circuitry, dedicated logic, programmable logic, microcode, etc.), software (such as instructions run on a processing device), firmware, or a combination thereof. For example, the multi-use application proxy 200 in FIG. 2 may perform at least part of the process in some embodiments.

Referring to FIG. 3B, processing logic at the multi-use application proxy receives a set of data intended for a client from an application (processing block 320). Then processing logic checks to determine if the set of data has conflict with another set of data intended for the client from another application (processing block 322). If there is no conflict, then processing logic sends the data to the client (processing block 328). Otherwise, if there is conflict, then processing logic prioritizes the multiple sets of data (processing block 324). Then processing logic sends the multiple sets of data to the client according to the respective priorities of the multiple sets of data (processing block 326).

Figure 3C:
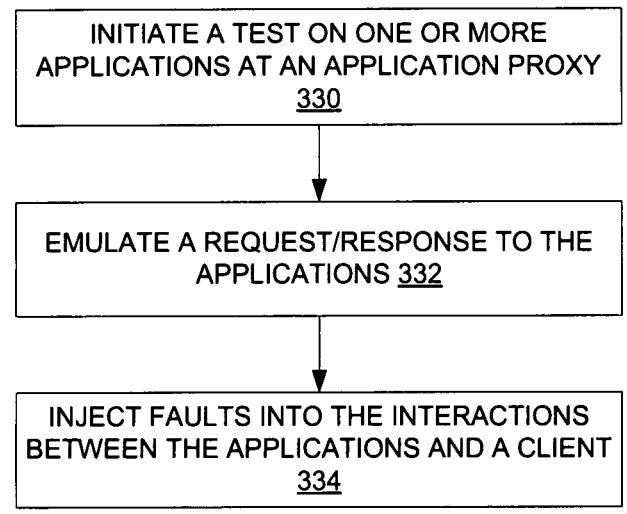
FIG. 3C illustrates a flow diagram of one embodiment of a process to use an application proxy to test the way different applications interact with each other.

FIG. 3C illustrates a flow diagram of one embodiment of a process to use an application proxy to test the way different applications interact with each other. The process may be performed by processing logic that may comprise hardware (e.g., circuitry, dedicated logic, programmable logic, microcode, etc.), software (such as instructions run on a processing device), firmware, or a combination thereof. For example, the multi-use application proxy 200 in FIG. 2 may perform at least part of the process in some embodiments.

Referring to FIG. 3C, processing logic initiates a test on one or more applications at a multi-use application proxy (processing block 330). For instance, processing logic may set a test flag or a test bit to signal entry into a test mode. Processing logic emulates a request from and/or a response to the applications (processing block 332). For example, processing logic may emulate a client submitting a log-in request to the applications. Alternatively, processing logic may emulate a client request to access some predetermined restricted information in order to test the security procedures of the applications.

In some embodiments, processing logic may inject faults into the interaction between the applications and a client (processing block 334). For example, processing logic may withhold a packet in a series of packets sent to an application to test the error-handling mechanism of the application. Based on the above examples, one should appreciate that processing logic at the multi-use application proxy may perform other operations to test the applications.

Figure 4:
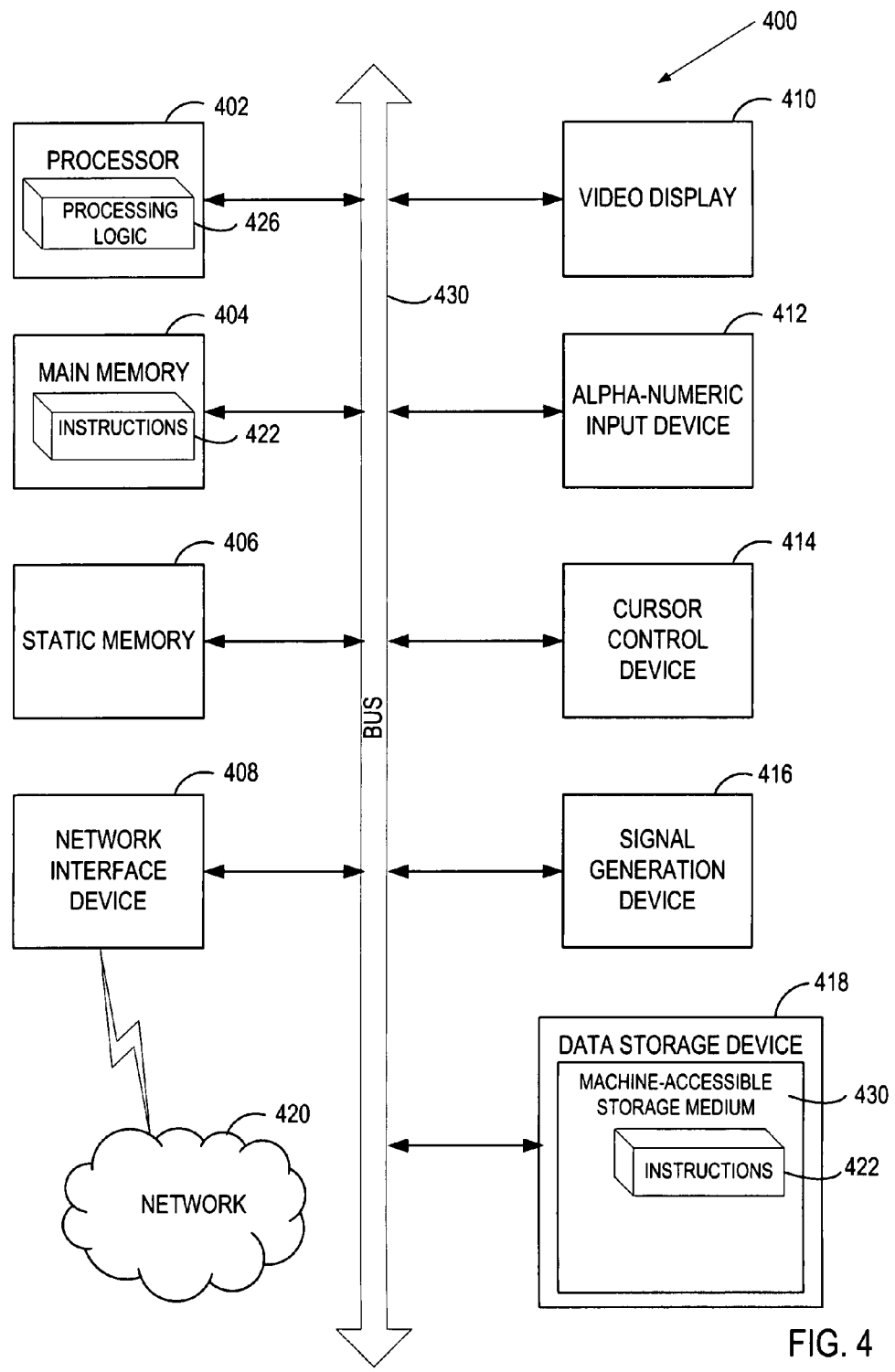
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a multi-use application proxy have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   executing, by a processing device, an application proxy as an intermediary between a plurality of applications separate from the application proxy;
   performing, by the application proxy, a plurality of functions between the plurality of applications and a client separate from the application proxy, the plurality of functions producing a corresponding plurality of responses received from the plurality of applications, a first function of the plurality of functions comprising executing a value-add-on application in view of the plurality of responses to produce a value-add-on response, a second function of the plurality of functions comprising prioritizing conflicts in sets of data within the responses received from the plurality of applications, wherein corresponding responses to the plurality of functions and the value-add-on response are presented to the client as a single combined response.

2. The method of claim 1, wherein performing the plurality of functions comprises:
   emulating at least one of a request and a response to a first one of the plurality of applications as if the at least one of the request and the response is from a second one of the plurality of applications.

3. The method of claim 1, wherein performing the plurality of functions comprises:
   processing data received from one of the plurality of applications; and
   sending the processed data to a client.

4. The method of claim 1, wherein performing the plurality of functions comprises:
   injecting faults into the interactions between the plurality of applications and a client to test a communication protocol adopted by the plurality of applications and the client.

5. The method of claim 1, wherein performing the plurality of functions comprises:
   providing a firewall between an internal network and an external network, wherein a first one of the plurality of applications is over the internal network and a second one of the plurality of applications is over the external network.

6. The method of claim 1, wherein the application proxy is executed on a proxy server communicatively coupled to a plurality of application servers, and the plurality of applications are executed on the plurality of application servers.

7. The method of claim 1, wherein the application proxy is executed on an application server, and at least one of the plurality of applications is executed on the application server.

8. An apparatus comprising:
   a memory; and
   a processing device coupled to the memory to:
      execute an application proxy as an intermediary between a plurality of applications separate from the application proxy;
      perform a plurality of functions between the plurality of applications and a client separate from the application proxy, the plurality of functions producing a corresponding plurality of responses received from the plurality of applications, a first function of the plurality of functions comprising executing a value-add-on application in view of the plurality of responses to produce a value-add-on response, a second function of the plurality of functions comprising prioritizing conflicts in sets of data within the responses received from the plurality of applications, wherein corresponding responses to the plurality of functions and the value-add-on response are presented to the client as a single combined response.

9. The apparatus of claim 8, wherein performing the plurality of functions comprises:
   emulating at least one of a request and a response to a first one of the plurality of applications as if the at least one of the request and the response is from a second one of the plurality of applications.

10. The apparatus of claim 8, wherein performing the plurality of functions comprises:
    injecting faults into the interactions between the plurality of applications and the client to test a communication protocol adopted by the plurality of applications and the client.

11. The apparatus of claim 8, wherein performing the plurality of functions comprises:
    providing a firewall between an internal network and an external network, wherein a first one of the plurality of applications is over the internal network and a second one of the plurality of applications is over the external network.

12. The apparatus of claim 8, wherein the application proxy is executed on a proxy server communicatively coupled to a plurality of application servers, and the plurality of applications are executed on the plurality of application servers.

13. The apparatus of claim 8, wherein the application proxy is executed on an application server, and at least one of the plurality of applications is executed on the application server.

14. A non-transitory computer readable medium instructions that, when executed by a processing device, cause the processing device to perform operations comprising:
   executing, by the processing device, an application proxy as an intermediary between a plurality of applications separate from the application proxy;
   performing, by the application proxy, a plurality of functions between the plurality of applications and a client separate from the application proxy, the plurality of functions producing a corresponding plurality of responses received from the plurality of applications, a first function of the plurality of functions comprising executing a value-add-on application in view of the plurality of responses to produce a value-add-on response, a second function of the plurality of functions comprising prioritizing conflicts in sets of data within the responses received from the plurality of applications, wherein corresponding responses to the plurality of functions and the value-add-on response are presented to the client as a single combined response.

15. The non-transitory computer readable medium of claim 14, wherein performing the plurality of functions comprises:
   emulating at least one of a request and a response to a first one of the plurality of applications as if the at least one of the request and the response is from a second one of the plurality of applications.

16. The non-transitory computer readable medium of claim 14, performing the plurality of functions comprises:
   processing data received from one of the plurality of applications; and
   sending the processed data to a client.

17. The non-transitory computer readable medium of claim 14, wherein performing the plurality of functions comprises:
   injecting faults into the interactions between the plurality of applications and a client to test a communication protocol adopted by the plurality of applications and the client.

18. The non-transitory computer readable medium of claim 14, wherein performing the plurality of functions comprises:
   providing a firewall between an internal network and an external network, wherein a first one of the plurality of applications is over the internal network and a second one of the plurality of applications is over the external network.

19. The non-transitory computer readable medium of claim 14, wherein the application proxy is executed on a proxy server communicatively coupled to a plurality of application servers, and the plurality of applications are executed on the plurality of application servers.

20. The non-transitory computer readable medium of claim 14, wherein the application proxy is executed on an application server, and at least one of the plurality of applications is executed on the application server.

* * * * *